US009584912B2

(12) United States Patent
Koppens et al.

(10) Patent No.: US 9,584,912 B2
(45) Date of Patent: Feb. 28, 2017

(54) SPATIAL AUDIO RENDERING AND ENCODING

(71) Applicant: KONINKLIJKE PHILIPS N.V., Eindhoven (NL)

(72) Inventors: Jeroen Gerardus Henricus Koppens, Eindhoven (NL); Erik Gosuinus Petrus Schuijers, Eindhoven (NL); Arnoldus Werner Johannes Oomen, Eindhoven (NL); Leon Maria Van De Kerkhof, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 220 days.

(21) Appl. No.: 14/372,068

(22) PCT Filed: Jan. 17, 2013

(86) PCT No.: PCT/IB2013/050419

§ 371 (c)(1),
(2) Date: Jul. 14, 2014

(87) PCT Pub. No.: WO2013/108200

PCT Pub. Date: Jul. 25, 2013

(65) Prior Publication Data

US 2014/0358567 A1 Dec. 4, 2014

Related U.S. Application Data

(60) Provisional application No. 61/588,394, filed on Jan. 19, 2012.

(51) Int. Cl.
*G01L 19/00* (2006.01)
*H04R 3/12* (2006.01)
(Continued)

(52) U.S. Cl.
CPC ................ *H04R 3/12* (2013.01); *G10L 19/00* (2013.01); *G10L 19/008* (2013.01); *G10L 19/20* (2013.01);
(Continued)

(58) Field of Classification Search
CPC .......... G10L 19/00; G10L 19/008; H04R 5/00
(Continued)

(56) References Cited

U.S. PATENT DOCUMENTS

2006/0165238 A1* 7/2006 Spille ...................... G10L 19/00 381/23
2007/0081597 A1* 4/2007 Disch et al. .................. 375/242
(Continued)

FOREIGN PATENT DOCUMENTS

CN 101361121 A 2/2009
CN 101433099 A 5/2009
(Continued)

OTHER PUBLICATIONS

Merimaa, J., "Energertic Sound Field Analysis of Stereo and Multichannel Loudspeaker Reproduction", Audio Engineering Society, Convention Paper 7257, 123rd Convention Oct. 5-8, 2007, NY.

(Continued)

*Primary Examiner* — Paras D Shah
(74) *Attorney, Agent, or Firm* — Larry Liberchuk

(57) ABSTRACT

An encoder (501) generates data representing an audio scene by a first downmix and data characterizing audio objects. In addition, a direction dependent diffuseness parameter indicative of a degree of diffuseness of a residual downmix is provided where the residual downmix corresponds to a downmix of audio components of the audio scene with the audio objects being extracted. A rendering apparatus (503) comprises a receiver (701) receiving the data from the
(Continued)

encoder (501). A circuit (703) generates signals for a spatial speaker configuration from the audio objects. A transformer (709) generates non-diffuse sound signals for the spatial speaker configuration by applying a first transformation to the residual downmix and another transformer (707) generates signals for the spatial speaker configuration by applying a second transformation to the residual downmix by applying a decorrelation to the residual downmix. The transformations are dependent on the direction dependent diffuseness parameter. The signals are combined to generate an output signal.

13 Claims, 7 Drawing Sheets

(51) Int. Cl.

| | |
|---|---|
| ***G10L 19/008*** | (2013.01) |
| ***G10L 19/20*** | (2013.01) |
| ***H04S 3/00*** | (2006.01) |
| ***G10L 19/00*** | (2013.01) |

(52) U.S. Cl.
CPC .......... *H04S 3/002* (2013.01); *H04R 2430/00* (2013.01); *H04S 3/004* (2013.01); *H04S 3/008* (2013.01); *H04S 2400/11* (2013.01); *H04S 2420/01* (2013.01)

(58) Field of Classification Search
USPC ...... 704/500–504; 381/1, 300, 306, 307, 26, 381/27, 310
See application file for complete search history.

(56) References Cited

U.S. PATENT DOCUMENTS

| | | | | |
|---|---|---|---|---|
| 2008/0232601 | A1* | 9/2008 | Pulkki | 381/1 |
| 2009/0092259 | A1* | 4/2009 | Jot et al. | 381/17 |
| 2010/0061558 | A1* | 3/2010 | Faller | 381/23 |
| 2010/0284549 | A1* | 11/2010 | Oh et al. | 381/119 |
| 2012/0039477 | A1* | 2/2012 | Schijers et al. | 381/22 |
| 2012/0114126 | A1* | 5/2012 | Thiergart et al. | 381/17 |
| 2012/0232910 | A1* | 9/2012 | Dressler et al. | 704/500 |
| 2013/0016842 | A1* | 1/2013 | Schultz-Amling et al. | 381/17 |
| 2013/0216047 | A1* | 8/2013 | Kuech et al. | 381/26 |
| 2013/0259243 | A1* | 10/2013 | Herre et al. | 381/57 |
| 2013/0304481 | A1* | 11/2013 | Briand | G10L 19/008 704/500 |
| 2014/0126725 | A1* | 5/2014 | Disch et al. | 381/22 |
| 2014/0233762 | A1* | 8/2014 | Vilkamo et al. | 381/119 |

FOREIGN PATENT DOCUMENTS

| | | | |
|---|---|---|---|
| EP | 2249334 | A1 | 11/2010 |
| WO | WO2008069593 | A1 | 6/2008 |

OTHER PUBLICATIONS

Corteel, E. et al., "Sound Scene Creation and Manipulation Using Wave Field Synthesis", IRCAM, Paris, France, Tech. Rep (2004).

* cited by examiner

SPATIAL AUDIO RENDERING AND ENCODING

FIELD OF THE INVENTION

The invention relates to spatial audio rendering and/or encoding, and in particular, but not exclusively, to spatial audio rendering systems with different spatial speaker configurations.

BACKGROUND OF THE INVENTION

Digital encoding of various source signals has become increasingly important over the last decades as digital signal representation and communication increasingly has replaced analogue representation and communication. For example, audio content, such as speech and music, is increasingly based on digital content encoding.

Audio encoding formats have been developed to provide increasingly capable, varied and flexible audio services and in particular audio encoding formats supporting spatial audio services have been developed.

Well known audio coding technologies like DTS and Dolby Digital produce a coded multi-channel audio signal that represents the spatial image as a number of channels that are placed around the listener at fixed positions. For a speaker setup that is different from the setup that corresponds to the multi-channel signal, the spatial image will be suboptimal. Also, these channel based audio coding systems are typically not able to cope with a different number of speakers.

MPEG Surround provides a multi-channel audio coding tool that allows existing mono- or stereo-based coders to be extended to multi-channel audio applications. FIG. 1 illustrates an example of elements of an MPEG Surround system. Using spatial parameters obtained by analysis of the original multichannel input, an MPEG Surround decoder can recreate the spatial image by a controlled upmix of the mono- or stereo signal to obtain a multichannel output signal.

Since the spatial image of the multi-channel input signal is parameterized, MPEG Surround allows for decoding of the same multi-channel bit-stream by rendering devices that do not use a multichannel speaker setup. An example is virtual surround reproduction on headphones, which is referred to as the MPEG Surround binaural decoding process. In this mode a realistic surround experience can be provided while using regular headphones. Another example is the pruning of higher order multichannel outputs, e.g. 7.1 channels, to lower order setups, e.g. 5.1 channels.

In order to provide for a more flexible representation of audio, MPEG standardized a format known as ‘Spatial Audio Object Coding’ (MPEG-D SAOC). In contrast to multichannel audio coding systems such as DTS, Dolby Digital and MPEG Surround, SAOC provides efficient coding of individual audio objects rather than audio channels. Whereas in MPEG Surround, each speaker channel can be considered to originate from a different mix of sound objects, SAOC makes individual sound objects available at the decoder side for interactive manipulation as illustrated in FIG. 2. In SAOC, multiple sound objects are coded into a mono or stereo downmix together with parametric data allowing the sound objects to be extracted at the rendering side thereby allowing the individual audio objects to be available for manipulation e.g. by the end-user.

Indeed, similarly to MPEG Surround, SAOC also creates a mono or stereo downmix. In addition object parameters are calculated and included. At the decoder side, the user may manipulate these parameters to control various features of the individual objects, such as position, level, equalization, or even to apply effects such as reverb. FIG. 3 illustrates an interactive interface that enables the user to control the individual objects contained in an SAOC bitstream. By means of a rendering matrix individual sound objects are mapped onto speaker channels.

Indeed, the variation and flexibility in the rendering configurations used for rendering spatial sound has increased significantly in recent years with more and more reproduction formats becoming available to the mainstream consumer. This requires flexible representation of audio. Important steps have been taken with the introduction of the MPEG Surround codec. Nevertheless, audio is still produced and transmitted for a specific loudspeaker setup. Reproduction over different setups and over non-standard (i.e. flexible or user-defined) speaker setups is not specified.

This problem can be partly solved by SAOC, which transmits audio objects instead of reproduction channels. This allows the decoder-side to place the audio objects at arbitrary positions in space, provided that the space is adequately covered by speakers. This way there is no relation between the transmitted audio and the reproduction setup, hence arbitrary speaker setups can be used. This is advantageous for e.g. home cinema setups in a typical living room, where the speakers are almost never at the intended positions. In SAOC, it is decided at the decoder side where the objects are placed in the sound scene, which is often not desired from an artistic point-of-view. The SAOC standard does provide ways to transmit a default rendering matrix in the bitstream, eliminating the decoder responsibility. However the provided methods rely on either fixed reproduction setups or on unspecified syntax. Thus SAOC does not provide normative means to transmit an audio scene independently of the speaker setup. More importantly, SAOC is not well equipped to the faithful rendering of diffuse signal components. Although there is the possibility to include a so called multichannel background object to capture the diffuse sound, this object is tied to one specific speaker configuration.

Another specification for an audio format for 3D audio is being developed by the 3D Audio Alliance (3DAA) which is an industry alliance initiated by SRS (Sound Retrieval System) Labs. 3DAA is dedicated to develop standards for the transmission of 3D audio, that “will facilitate the transition from the current speaker feed paradigm to a flexible object-based approach”. In 3DAA, a bitstream format is to be defined that allows the transmission of a legacy multichannel downmix along with individual sound objects. In addition, object positioning data is included. The principle of generating a 3DAA audio stream is illustrated in FIG. 4.

In the 3DAA approach, the sound objects are received separately in the extension stream and these may be extracted from the multi-channel downmix. The resulting multi-channel downmix is rendered together with the individually available objects.

The objects may consist of so called stems. These stems are basically grouped (downmixed) tracks or objects. Hence, an object may consist of multiple sub-objects packed into a stem. In 3DAA, a multichannel reference mix can be transmitted with a selection of audio objects. 3DAA transmits the 3D positional data for each object. The objects can then be extracted using the 3D positional data. Alternatively, the inverse mix-matrix may be transmitted, describing the relation between the objects and the reference mix.

From the description of 3DAA, sound-scene information is likely transmitted by assigning an angle and distance to each object, indicating where the object should be placed relative to e.g. the default forward direction. This is useful for point-sources but fails to describe wide sources (like e.g. a choir or applause) or diffuse sound fields (such as ambiance). When all point-sources are extracted from the reference mix, an ambient multichannel mix remains. Similar to SAOC, the residual in 3DAA is fixed to a specific speaker setup.

Thus, both the SAOC and 3DAA approaches incorporate the transmission of individual audio objects that can be individually manipulated at the decoder side. A difference between the two approaches is that SAOC provides information on the audio objects by providing parameters characterizing the objects relative to the downmix (i.e. such that the audio objects are generated from the downmix at the decoder side) whereas 3DAA provides audio objects as full and separate audio objects (i.e. that can be generated independently from the downmix at the decoder side).

A typical audio scene will comprise different types of sound. In particular, an audio scene will often include a number of specific and spatially well-defined audio sources. In addition, the audio scene may typically contain diffuse sound components representing the general ambient audio environment. Such diffuse sounds may include e.g. reverberation effects, non-directional noise, etc.

A critical problem is how to handle such different audio types and in particular how to handle such different types of audio in different speaker configurations. Formats such as SAOC and 3DAA can flexibly render point sources. However, although such approaches may be advantageous over channel based approaches, the rendering of diffuse sound sources at different speaker configurations is suboptimal.

A different approach for differentiating the rendering of sound point sources and diffuse sounds have been proposed in the article "Spatial Sound Reproduction with Directional Audio Coding", by Ville Pulkki, Journal Audio Engineering Society, Vol. 55, No. 6, June 2007. The article proposes an approach referred to as DirAC (Directional Audio Coding) wherein a downmix is transmitted along with parameters that enable a reproduction of a spatial image at the synthesis side. The parameters communicated in DirAC are obtained by a direction and diffuseness analysis. Specifically, DirAC discloses that in addition to communicating azimuth and elevation for sound sources, a diffuseness indication is also communicated. During synthesis the downmix is divided dynamically into two streams, one that corresponds to non-diffuse sound, and another that corresponds to the diffuse sound. The non-diffuse sound stream is reproduced with a technique aiming at point like sound sources, and the diffuse sound stream is rendered by a technique aiming at the perception of sound which lacks prominent direction.

The downmixes described in the article are either a mono or a B-format type of downmix. In the case of a mono downmix, diffuse speaker signals are obtained by decorrelating the downmix using a separate decorrelator for each loudspeaker position. In the case of a B-format downmix, virtual microphone signals are extracted for each loudspeaker position from the B-format modeling cardioids in the direction of the reproduction speakers. These signals are split in a part representing the directional sources and a part representing diffuse sources. For the diffuse components, decorrelated versions of the 'virtual signals' are added to the obtained point source contribution for each loudspeaker position.

However, although DirAC provides an approach that may improve audio quality over some systems that do not consider separate processing of spatially defined sound sources and diffuse sounds, it tends to provide suboptimal sound quality. In particular, when adapting the system to different speaker configurations, the specific rendering of diffuse sounds based only on a relatively simple division of downmix signals into diffuse/non-diffuse components tend to result in a less than ideal rendering of the diffuse sound. In DirAC, the energy of the diffuse signal component is directly determined by the point sources present in the input signal. Therefore, it is not possible to e.g. generate a truly diffuse signal in the presence of point sources.

Hence, an improved approach would be advantageous and in particular an approach allowing increased flexibility, improved audio quality, improved adaptation to different rendering configurations, improved rendering of diffuse sounds and/or audio point sources of a sound scene and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided a spatial audio rendering apparatus comprising: a circuit for providing a residual downmix and data characterizing at least one audio object, the residual downmix corresponding to a downmix of audio components of an audio scene with the at least one audio object extracted; a receiver for receiving a diffuseness parameter indicative of a degree of diffuseness of the residual downmix; a first transformer for generating a first set of signals for a spatial speaker configuration by applying a first transformation to the residual downmix, the first transformation being dependent on the diffuseness parameter; a second transformer for generating a second set of signals for the spatial speaker configuration by applying a second transformation to the residual downmix, the second transformation being dependent on the diffuseness parameter and comprising a decorrelation of at least one channel of the residual downmix; a circuit for generating a third set of signals for the spatial speaker configuration from the data characterizing the at least one audio object; and an output circuit for generating an output set of signals for the spatial speaker configuration by combining the first, second and third set of signals; and wherein the diffuseness parameter is direction dependent.

The invention may provide improved audio rendering. In particular, it may in many embodiments and for many different audio scenes and rendering setups provide an improved audio quality and user experience. In many scenarios the approach may in particular provide an improved rendering of residual downmixes with improved consideration of spatial characteristics of different audio components of the residual downmix.

The inventors of the present invention have realized that improved performance can often be achieved by not just considering two types of audio components. Indeed, in contrast to traditional approaches, the inventors have realized that it is advantageous to consider the downmix from which the residual downmix is derived to contain at least three types of audio components, namely specific audio sources that are represented by audio objects and which accordingly may be extracted, specific spatially positioned audio sources (e.g. point sources) which are not represented by audio objects and which accordingly cannot be extracted from the downmix, and diffuse sound sources. Thus, the inventors have realized that it may be advantageous to process the residual downmix to render both spatially specific sound components and diffuse sound components. The inventors have further realized that rendering of diffuse sound components separately from spatially more specific sound components may provide improved audio rendering. The inventors have also realized that some sound components may be both diffuse yet still exhibit spatial characteristics, and that an improved spatial rendering of such partially diffuse sound sources provide improved sound quality.

The use of a direction dependent diffuseness parameter allows e.g. an encoder to control the rendering side processing to provide improved rendering of the residual downmix, and in particular may allow a rendering of (in particular) diffuse or partially diffuse sound components to be adapted to variety of spatial speaker configurations.

Indeed, the approach may in many scenarios provide improved rendering of the residual sound field for flexible speaker locations with the rendering providing appropriate handling of both the point sources and (partially) diffuse sound components in the residual signal. E.g. point like sources may be adapted to a given configuration using panning whereas diffuse components may be distributed over the available speakers to provide a homogenous non-directional reproduction. A sound field may also consist of partially diffuse sound components, i.e. sound sources which have some diffuse and some non-diffuse components. In the following, a reference to a diffuse signal component is accordingly also intended to be inclusive of a reference to a partially diffuse signal component.

In the approach, the residual downmix is processed in parallel to provide both a rendering suitable for non-diffuse sound components and for diffuse sound components. In particular, the first set of signals may represent non-diffuse sound components whereas the second set of signals may represent diffuse sound components. In particular, the approach may result in the first set of signals rendering spatially specific sound sources of the residual downmix in accordance with an approach suitable for specific sound sources (e.g. panning), while allowing the second set of signals to provide a diffuse sound rendering suitable for diffuse sounds. Furthermore, by such processes in response to a direction dependent diffuseness parameter that may be generated at the encoder, an appropriate and improved rendering of both types of audio components can be achieved. Furthermore, in the approach, specific audio sources may be rendered using audio object processing and manipulation. Thus, the approach may allow efficient rendering of three types of sound components in the audio scene thereby providing an improved user experience.

The application of decorrelation by the second transformer provides for an improved perception of diffuse sound components and in particular allows it to be differentiated from the part of the residual downmix being reproduced as spatially more defined sound components (i.e. it allows the rendered sound from the second set of signals to be perceptually differentiated from the rendered sound from the first set of signals). The decorrelation may in particular provide improved diffuse sound perceptions when there is a mismatch in speaker positions between the position assumed for the residual downmix and the actual position of the spatial speaker configuration. Indeed, the decorrelation provides an improved perception of diffuseness which in the system can be applied while still maintaining spatial characteristics for e.g. point sources in the residual downmix due to the processing in parallel paths. The relative weighting of the diffuse/non-diffuse renderings may be dependent on the actual relationship between diffuse and non-diffuse sound in the residual downmix. This can be determined at the encoder side and communicated to the rendering side via the diffuseness parameter. The rendering side can accordingly adapt its processing dependent on e.g. the ratio of diffuse to non-diffuse sound in the residual downmix. As a consequence, the system may provide improved rendering and in particular be much more robust to differences between the spatial rendering assumptions associated with the residual downmix and the actual spatial speaker configuration used at the rendering side. This may in particular provide a system which can achieve improved adaptation to many different rendering speaker setups.

The circuit for providing the residual downmix may specifically be able to receive or generate the residual downmix. For example, the residual downmix may be received from an external or internal source. In some embodiments, the residual downmix may be generated and received from an encoder. In other embodiments, the residual downmix may be generated by the audio rendering apparatus, e.g. from a received downmix and data characterizing the audio object(s).

The residual downmix may be associated with a specific spatial configuration. The spatial configuration may be a rendering speaker configuration, such as a nominal, reference or assumed spatial configuration of the positions of the rendering speakers (which may be real or virtual speakers). In some scenarios, the spatial configuration of the residual downmix may be associated with a sound(field) capture configuration, such as a microphone configuration resulting in the sound components of the residual downmix. An example of such a configuration is a B format representation which may be used as a representation for the residual downmix.

The spatial speaker configuration may be a spatial configuration of real or virtual sound transducers. In particular, each signal/channel of the output set of signals may be associated with a given spatial position. The signal is then rendered to appear to a listener to arrive from this position.

The data characterizing the audio object(s) may characterize the audio object(s) by a relative characterization (e.g. relative to the downmix (which may also be received from an encoder)), or may be an absolute and/or complete characterization of the audio object(s) (such as a complete encoded audio signal). Specifically, the data characterizing the audio objects may be spatial parameters describing how audio objects are generated from the downmix (such as in SAOC) or may be independent representations of the audio objects (such as in 3DAA).

An audio object may be an audio signal component corresponding to a single sound source in the represented audio environment. Specifically, the audio object may include audio from only one position in the audio environment. An audio object may have an associated position but not be associated with any specific rendering sound source configuration, and may specifically not be associated with any specific loudspeaker configuration.

In accordance with an optional feature of the invention, the diffuseness parameter comprises individual diffuseness values for different channels of the residual downmix.

This may provide a particular advantageous audio rendering in many embodiments. In particular, each channel of a multi-channel downmix may be associated with a spatial configuration (e.g. a real or virtual speaker setup) and the direction dependent diffuseness parameter may provide an individual diffuseness value for each of these channels/directions. Specifically, the diffuseness parameter may indicate the weight/proportion of diffuseness respectively non-diffuseness in each downmix channel. This may allow the rendering to be adapted to the specific characteristics of the individual downmix channels.

In some embodiments, the diffuseness parameter may be frequency dependent. This may allow an improved rendering in many embodiments and scenarios.

In accordance with an optional feature of the invention, a contribution of the second transformation relative to a contribution of the first transformation in the output signal increases for the diffuseness parameter indicating an increased diffuseness (at least one channel of the residual downmix).

This may provide improved rendering of an audio scene. The weighting of non-correlated and decorrelated rendering of each downmix channel may be adapted based on the diffuseness parameter thereby allowing the rendering to be adapted to the specific characteristics of the audio scene. An increased diffuseness will decrease the energy of the component of the first set of signals originating from the specific channel of the residual downmix and will increase the energy of the component of the second set of signals originating from the specific channel of the residual downmix.

In some embodiments, a first weight for a channel of the residual downmix for the first transformation decreases for the diffuseness parameter indicating increased diffuseness, and a second weight for the channel of the residual downmix for the second transformation increases for the diffuseness parameter indicating increased diffuseness.

In accordance with an optional feature of the invention, a combined energy of the first set of signals and the second set of signals is substantially independent of the diffuseness parameter.

The signal independent value may be independent of any characteristics of the residual downmix. Specifically, the signal independent value may be a fixed and/or predetermined value. The approach may specifically maintain the relative energy levels of the downmix channel(s) in the first and second sets of signals. Effectively, each downmix channel may be distributed across the first transformation and the second transformation with a distribution that depends on the diffuseness parameter but which does not change the overall energy level of the downmix channel relative to other downmix channels.

In accordance with an optional feature of the invention, the second transformer is arranged to adjust an audio level of a first signal of the second set of signals in response to a distance of a speaker position associated with the first signal to at least one neighboring speaker position associated with a different signal of the second set of signals.

This may provide an improved rendering and may in particular allow an improved rendering of diffuse sound components of the residual downmix. The proximity may be an angular proximity and/or distance to the nearest speaker or speakers. In some embodiments the audio level for a first channel may be adjusted in response to an angular interval from a listening position in which the speaker corresponding to the first channel is the closest speaker.

In some embodiments, the spatial speaker configuration may comprise a number of channels corresponding to the number of channels in the residual downmix, and the second transformer may be arranged to map channels of the residual downmix to speaker positions of the spatial rendering configuration in response to spatial information associated with the residual downmix.

This may provide improved rendering in some embodiments. In particular, each downmix channel may be associated with a nominal, reference or assumed spatial position and this may be matched to the speaker position of the rendering configuration which most closely matches this.

In accordance with an optional feature of the invention, the residual downmix comprises fewer channels than a number of speaker positions of the spatial speaker configuration, and wherein the second transformer is arranged to generate a plurality of signals of the second set of signals by applying a plurality of decorrelations to at least a first channel of the residual downmix.

This may provide a particularly advantageous rendering of diffuse sound and may provide an improved user experience.

In accordance with an optional feature of the invention, the second transformer is arranged to generate a further plurality of signals of the second set of signals by applying a plurality of decorrelations to a second channel of the residual downmix, the second channel not being a channel of the at least first channels.

This may provide a particularly advantageous rendering of diffuse sound and may provide an improved user experience. In particular, the use of a plurality, and in many embodiments advantageously all, of the downmix channels to generate additional diffuse sound signals may provide a particularly advantageous diffuse sound rendering. In particular, it may increase the decorrelation between channels and thus increase the perception of diffuseness.

In some embodiments, the same decorrelation may be applied to the first and second channel thereby reducing complexity while still generating sound signals that are decorrelated and thus are perceived as diffuse sound. This may still provide decorrelated signals provided the input signals to the decorrelator are decorrelated.

In accordance with an optional feature of the invention, the second set of signals comprises fewer signals than a number of speaker positions in the spatial speaker configuration.

In some embodiments diffuse signals may only be rendered from a subset of the speakers of the spatial speaker configuration. This may in many scenarios result in an improved perception of diffuse sound.

In some embodiments, the residual downmix comprises more channels than a number of speaker positions of the spatial speaker configuration, and wherein the second transformer is arranged to ignore at least one channel of the residual downmix when generating the second set of signals This may provide a particularly advantageous rendering of diffuse sound and may provide an improved user experience.

In accordance with an optional feature of the invention, the residual downmix comprises more channels than a number of speaker positions of the spatial speaker configuration, and wherein the second transformer is arranged to combine at least two channels of the residual downmix when generating the second set of signals.

This may provide a particularly advantageous rendering of diffuse sound and may provide an improved user experience.

In accordance with an optional feature of the invention, the second transformer is arranged to generate the second set of signals to correspond to a sideways rendering of audio from the second set of signals.

This may provide a particularly advantageous rendering of diffuse sound and may provide an improved user experience.

In accordance with an optional feature of the invention, the receiver is arranged to receive a received downmix comprising the audio objects; and the circuit for providing the residual downmix is arranged to generate at least one audio object in response to the data characterizing the data objects, and to generate the residual downmix by extracting the at least one audio object from the received downmix.

This may provide a particularly advantageous approach in many embodiments.

In accordance with an optional feature of the invention, the spatial speaker configuration is different from a spatial sound representation of the residual downmix.

The invention may be particularly suitable for adapting a specific (residual) downmix to a different speaker configuration. The approach may provide for a system which allows improved and flexible adaptation to different speaker setups.

According to an aspect of the invention there is provided a spatial audio encoding apparatus comprising: a circuit for generating encoded data representing an audio scene by a first downmix and data characterizing at least one audio object; a circuit for generating a direction dependent diffuseness parameter indicative of a degree of diffuseness of a residual downmix, the residual downmix corresponding to a downmix of audio components of the audio scene with the at least one audio object being extracted; and an output circuit for generating an output data stream comprising the first downmix, the data characterizing the at least one audio object, and the direction dependent diffuseness parameter.

The first downmix may be the residual downmix. In some embodiments, the first downmix may be a downmix including the audio components of the audio scene and may in particular be a downmix including the at least one audio object.

According to an aspect of the invention there is provided a method of generating spatial audio output signals, the method comprising: providing a residual downmix and data characterizing at least one audio object, the residual downmix corresponding to a downmix of audio components of an audio scene with the at least one audio object extracted; receiving a diffuseness parameter indicative of a degree of diffuseness of the residual downmix; generating a first set of signals for a spatial speaker configuration by applying a first transformation to the residual downmix, the first transformation being dependent on the diffuseness parameter; generating a second set of signals for the spatial speaker configuration by applying a second transformation to the residual downmix, the second transformation being dependent on the diffuseness parameter and comprising a decorrelation of at least one channel of the residual downmix; generating a third set of signals for the spatial speaker configuration from the data characterizing the at least one audio object; and generating an output set of signals for the spatial speaker configuration by combining the first, second and third set of signals; and wherein the diffuseness parameter is direction dependent.

According to an aspect of the invention there is provided a method of spatial audio encoding comprising: generating encoded data representing an audio scene by a first downmix and data characterizing at least one audio object; generating a direction dependent diffuseness parameter indicative of a degree of diffuseness of a residual downmix, the residual downmix corresponding to a downmix of audio components of the audio scene with the at least one audio object being extracted; and generating an output data stream comprising the first downmix, the data characterizing the at least one audio object, and the direction dependent diffuseness parameter.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
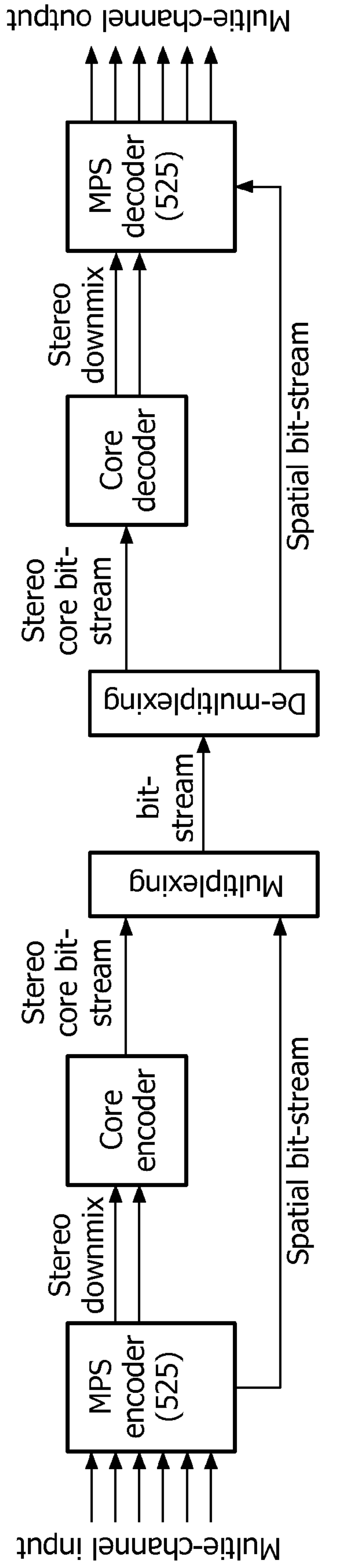
FIG. 1 illustrates an example of elements of an MPEG Surround system in accordance with the prior art.
Figure 2:
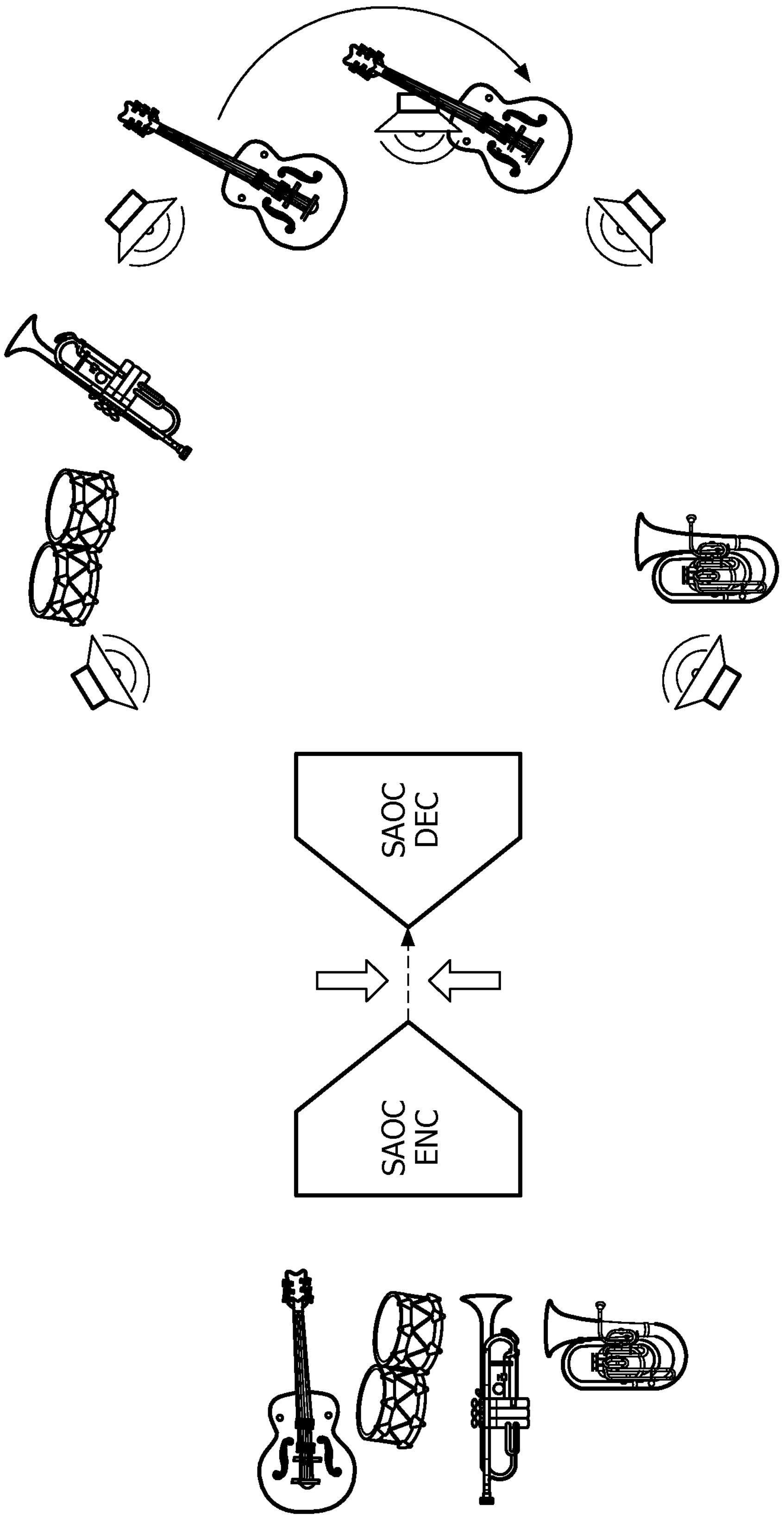
FIG. 2 exemplifies the manipulation of audio objects possible in MPEG SAOC.
Figure 3:
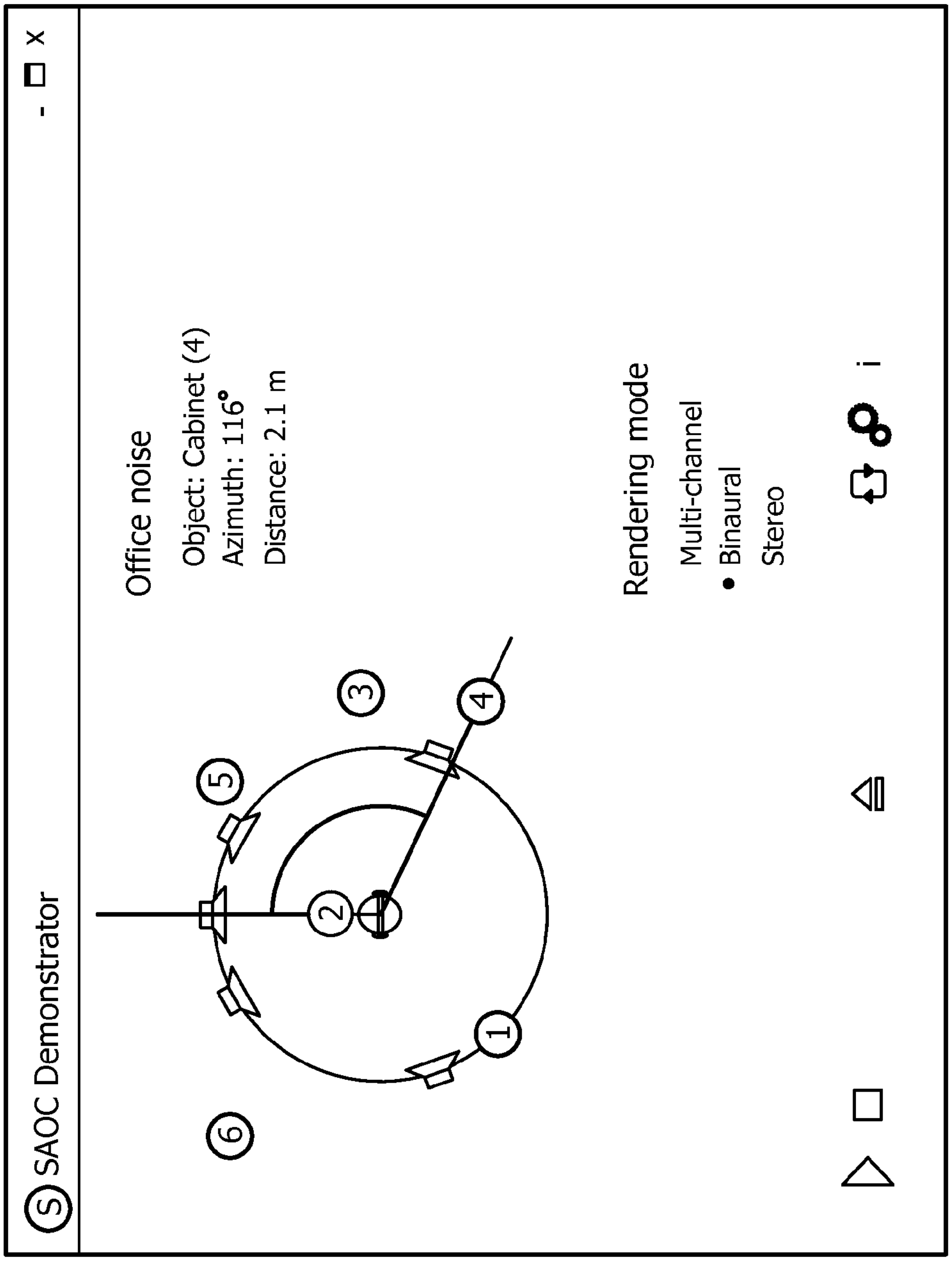
FIG. 3 illustrates an interactive interface that enables the user to control the individual objects contained in a SAOC bitstream.
Figure 4:
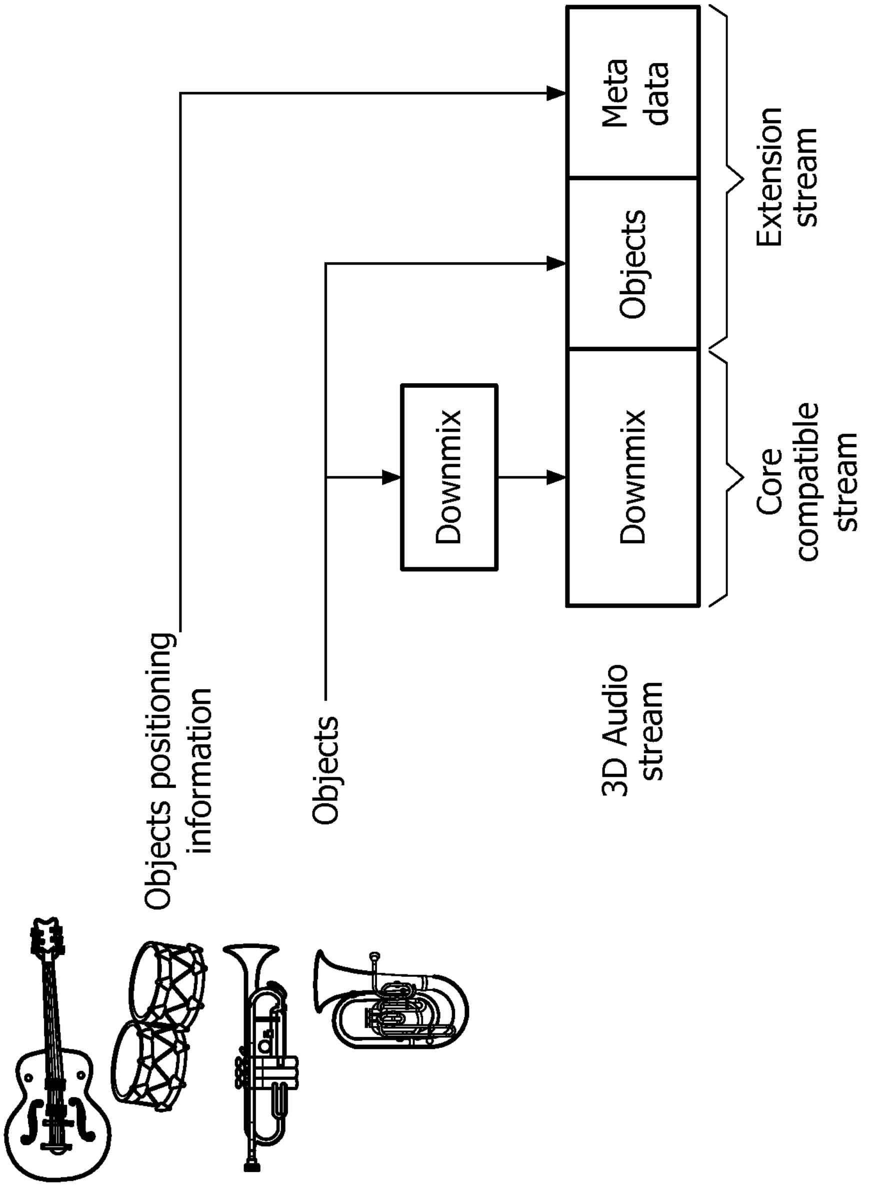
FIG. 4 illustrates an example of the principle of audio encoding of 3DAA in accordance with the prior art.
Figure 5:
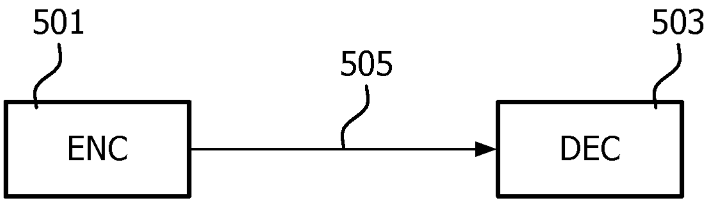
FIG. 5 illustrates an example of an audio rendering system in accordance with some embodiments of the invention.

FIG. 5 illustrates an example of an audio rendering system in accordance with some embodiments of the invention. The system comprises a spatial audio encoding device 501 which receives audio information to be encoded. The encoded audio data is transmitted to a spatial audio rendering device 503 via a suitable communication medium 505. The spatial audio rendering device 503 is furthermore coupled to a set of speakers associated with a given spatial speaker configuration.

The audio data provided to the spatial audio encoding device 501 may be provided in different forms and generated in different ways. For example, the audio data may be audio captured from microphones and/or may be synthetically generated audio such as for example for computer games applications. The audio data may include a number of components that may be encoded as individual audio objects, such as e.g. specific synthetically generated audio objects or microphones arranged to capture a specific audio source, such as e.g. a single instrument.

Each audio object typically corresponds to a single sound source. Thus, in contrast to audio channels, and in particular audio channels of a conventional spatial multichannel signal, the audio objects do not comprise components from a plurality of sound sources that may have substantially different positions. Similarly, each audio object provides a full representation of the sound source. Each audio object is thus typically associated with spatial position data for only a single sound source. Specifically, each audio object may be considered a single and complete representation of a sound source and may be associated with a single spatial position.

Furthermore, the audio objects are not associated with any specific rendering configuration and are specifically not associated with any specific spatial configuration of sound transducers. Thus, in contrast to traditional spatial sound channels which are typically associated with a specific spatial speaker setup, such as in particular a surround sound setup, audio objects are not defined with respect to any specific spatial rendering configuration.

The spatial audio encoding device 501 is arranged to generate an encoded signal which includes a downmix and data characterizing one or more audio objects. The downmix may in some embodiments be a residual downmix corresponding to a representation of an audio scene but without the audio objects that are represented by the audio object data. However, often the transmitted downmix includes the audio objects such that a direct rendering of the downmix will result in a rendering of all audio sources of the sound scene. This may provide backward compatibility.

The encoded audio stream may be communicated through any suitable communication medium including direct communication or broadcast links. For example, communication may be via the Internet, data networks, radio broadcasts etc. The communication medium may alternatively or additionally be via a physical storage medium such as a CD, Blu-Ray™ disc, memory card etc.

The output of the spatial audio rendering device 503 is arranged to match the spatial speaker configuration. The spatial speaker configuration may be a nominal, reference, or assumed spatial speaker configuration. Thus, the actual position of speakers used for the rendering of the audio signal may vary from the spatial speaker configuration although users will typically strive to provide as close a correlation between the spatial speaker configuration and the actual speaker positions as is practically feasible.

Also, in some embodiments the spatial speaker configuration may represent virtual speakers. For example, for a binaural spatial rendering system (e.g. based on Head Related Transfer Functions), the rendering of the audio output may be via headphones emulating e.g. a surround sound setup. Alternatively the number of virtual speakers may be much higher than typical speaker setups providing a higher spatial resolution for rendering audio objects.

The system of FIG. 5 thus uses an encoding approach that supports audio objects and which specifically may use approaches known from SAOC and 3DAA.

The system of FIG. 5 may accordingly be seen to provide a first differentiation between different types of sound components in the audio scene by encoding some sound components as specific audio objects represented by specific data characterizing the audio objects, whereas other sound components are only encoded in the downmix, i.e. for these other sound components a plurality of sound sources are typically encoded together in the channel(s) of the downmix. Typically, this approach is suitable for encoding specific point like sources as audio objects that can be panned to a specific position, while encoding the more diffuse sound components as a combined downmix. However, the Inventors of the current invention have realized that a simple differentiation into diffuse and non-diffuse (and specifically into audio objects and diffuse sound) is suboptimal. Indeed, it has been realized that the sound scene may contain typically four different types of sound components:

1. Spatially specific (point-like) sources that have been transmitted as individual audio objects (in the following sometimes referenced by O),
2. Spatially specific (point) sources that have not been transmitted as individual audio objects (in the following sometimes referenced by $O_1$),
3. A diffuse sound source that has a specific spatial area of origin, such as for example a small choir (in the following sometimes referenced by $O_2$), and
4. An omnidirectional diffuse sound field, for example ambient noise or reverberation (in the following sometimes referenced by $O_3$).

Traditional systems merely seek to differentiate between diffuse and non-diffuse sound components. For example, 3DAA render all of the sound components of the latter three categories by an undifferentiated rendering of a residual downmix from which the audio components have been extracted. However, since the residual downmix still includes signal components that are related to audio sources with some spatial characteristics (e.g. point sources, diffuse sound sources with some direction such as a choir and diffuse signal) as well as audio sources with essentially no spatial characteristics (such as ambience or reverberation) the combined rendering results in a suboptimal rendering.

In the system of FIG. 5, information is provided from the encoder which also allows a differentiated rendering of the latter categories. Specifically, a diffuseness parameter is generated in the encoder which represents the degree of diffuseness of the residual downmix. This allows the decoder/renderer to divide the residual downmix into a part that can be rendered as appropriate for point like sound sources and a part that can be rendered as appropriate for diffuse sound. The diffuseness parameter may specifically indicate how large a proportion of each downmix channel that should be rendered respectively as point sources and as diffuse sound. The diffuseness parameter may be a parameter allowing for a good split between the two types of audio components. For example, the diffuseness parameter may include filter parameters characterizing how the different audio components can be rendered at the decoder.

Furthermore, the diffusion parameter is direction dependent thereby allowing spatial characteristics to be reproduced for diffuse sounds. For example, the diffuseness parameter may indicate different portions of point source and diffuse sound for different channels of the downmix with each channel of the downmix being associated with a different spatial rendering position. This may be used by the spatial audio rendering device 503 to render a different proportion of each downmix channel as respectively non-diffuse and diffuse sound. Specifically, depending on the amount of diffuseness and directionality of the sound sources of the second type (O2), these may be partly rendered as either point sources (O1) or diffuse sound (O3).

The direction dependent diffuseness parameter may also provide improved adaptation to various rendering speaker configurations. The approach uses a characterization of the diffuse sound field which is independent of reproduction setup. The data stream transmitted from the spatial audio encoding device 501 can, by the spatial audio encoding device 501 be translated to speaker signals for a given speaker setup.

In the system of FIG. 5, the audio data provided to the spatial audio encoding device 501 is used to create a downmix, (such as a 5.1 channel downmix that can readily be rendered by legacy surround sound rendering equipment) using a downmix matrix (D). A number of audio objects (O) are transmitted along with the compatible downmix. As part of the object selection process, a diffuseness parameter $\Psi_{c,f}$ is in the example determined with a specific value being provided for each downmix channel (index c) and (optionally) frequency band (index f).

At the spatial audio rendering device 503, a residual downmix corresponding to the received downmix with the audio objects (O) extracted (the residual downmix thus containing $O_1+O_2+O_3$) is determined by using the downmix matrix D. The residual downmix is then rendered based on the diffuseness parameter $\Psi_{c,f}$.

For example, diffuse signal components can be separated from point source components using the diffuseness parameter $\Psi_{c,f}$. The resulting point source components can then be panned to the speaker positions of the current rendering configuration. The diffuse signal components are first decorrelated and are then rendered e.g. from the speaker positions that are closest to the position of the corresponding downmix signal's intended speaker position. Due to the spatial discrepancy between diffuse components and direct components, the decorrelation may provide an improved audio quality. The distribution of the sound components that are diffuse but have spatial characteristics are partly rendered as diffuse sound components and as spatially specific sound components with the separation being based on the diffuseness parameters $\Psi_{c,f}$. Thus, the diffuseness parameter $\Psi_{c,f}$ generated by the spatial audio encoding device 501 provides information on characteristics of the residual downmix which allows the spatial audio rendering device 503 to implement a differentiated rendering of the residual downmix such that this corresponds more closely to the original audio scene. Alternatively, the diffuse signals may be rendered to the intended positions on the speaker configuration using panning, followed by decorrelation. The decorrelation removes the correlation introduced by the panning. This approach is particularly beneficial in diffuse components with spatial characteristics.

Figure 6:
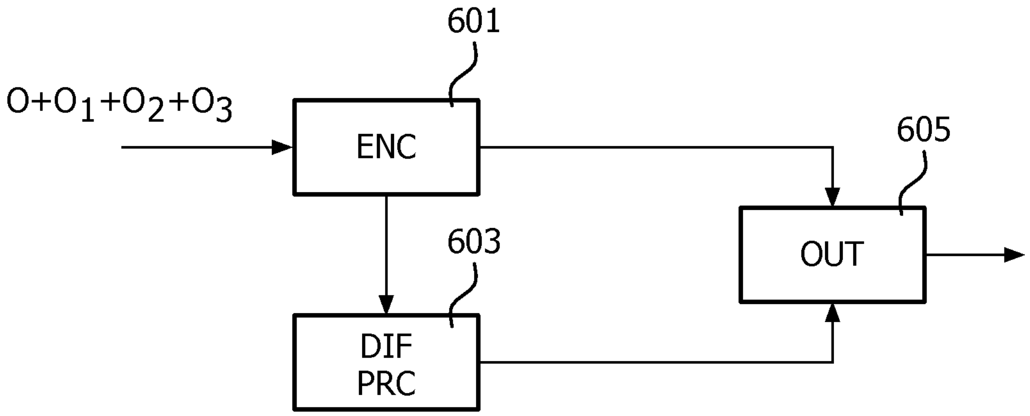
FIG. 6 illustrates an example of a spatial audio encoding device in accordance with some embodiments of the invention.

FIG. 6 illustrates some elements of the spatial audio encoding device 501 in more detail. The spatial audio encoding device 501 comprises an encoder 601 which receives audio data describing an audio scene. In the example, the audio scene includes sound components of all four types of sound O, $O_1$, $O_2$, $O_3$. The audio data representing the audio scene may be provided as discrete and individual data characterizing each of the individual sound types. For example, a synthetic audio scene may be generated and data for each audio source may be provided as an individual and separate set of audio data. As another example, the audio data may be represented by audio signals e.g. generated by a plurality of microphones capturing sound in an audio environment. In some scenarios a separate microphone signal may be provided for each audio source. Alternatively or additionally, some or all of the individual sound sources may be combined into one or more of the microphone signals. In some embodiments, individual sound components may be derived from combined microphone signals, e.g. by audio beamforming etc.

The encoder 601 proceeds to generate encoded audio data representing the audio scene from the received audio data. The encoder 601 represents the audio by a downmix and a number of individual audio objects.

For example, the encoder 601 may perform a mixing operation to mix the audio components represented by the input audio data into a suitable downmix. The downmix may for example be a mono-downmix, a B-format representation downmix, a stereo downmix, or a 5.1 downmix. This downmix can be used by legacy (non-audio object capable) equipment. For example, a 5.1 spatial sound rendering system can directly use the 5.1 compatible downmix. The downmixing is performed in accordance with any suitable approach. Specifically, the downmix may be performed using a downmix matrix D which may also be communicated to the spatial audio rendering device 503.

The downmix may also be created by a mixing engineer.

The encoder furthermore generates audio data characterizing a number of audio objects (O). These audio objects are typically the most important point like sound sources of the audio scene, such as the most dominant musical instruments in a capture of a concert. This process may also be controlled by the maximum allowed bit rate. In that sense a bit rate scalable solution is realized. By representing them as individual audio objects they can be individually processed at the rendering side, e.g. allowing the end user to individually filter, position, and set the audio level for each audio object. The audio objects (O) may be encoded as separate data, i.e. with the audio object data fully characterizing the audio object (as is possible using 3DAA) or may be encoded relative to the downmix, e.g. by providing parameters describing how to generate the audio objects from the downmix (as is done in SAOC).

The encoder typically also generates a description of the intended audio scene. For example a spatial position for each audio object, allowing the spatial rendering device (503) to provide an improved audio quality.

In the example, the generated downmix thus represents the entire audio scene including all sound components O, $O_1$, $O_2$, $O_3$. This allows the downmix to be directly rendered without any complex or further processing being required. However, in scenarios where the audio objects are extracted and individually rendered, the renderer should not render the entire downmix but only the remaining components after the audio objects have been extracted (i.e. $O_1$, $O_2$, $O_3$). The downmix of the sound stage with the audio objects extracted are referred to as a residual downmix and represents the audio scene with the sound components that are individually coded as audio objects being removed.

In many embodiments, the encoder 601 may generate a downmix which includes all the audio components (O, $O_1$, $O_2$, $O_3$), i.e. a downmix which also includes the separately encoded audio objects (O). This downmix may be communicated together with the data characterizing the audio objects. In other embodiments, the encoder 601 may generate a downmix which does not include the separately encoded audio objects (O) but only the non-separately encoded audio objects. Thus, in some embodiments, the encoder 601 may only generate the residual downmix, e.g. by only mixing the associated sound components ($O_1$, $O_2$, $O_3$) and ignoring the sound components that are to be encoded as individual audio objects.

The encoder 601 is furthermore coupled to a diffuseness processor 603 which is fed the downmix. The diffuseness processor 603 is arranged to generate a direction dependent diffuseness parameter indicative of a degree/level of diffuseness of the residual downmix.

In some embodiments, the diffuseness parameter may be indicative of a degree/level of diffuseness of the (non-residual) downmix. Specifically, it may be indicative of a degree of diffuseness for a full downmix transmitted from the encoder 501. In such a case, the decoder 503 may generate a diffuseness parameter indicative of a degree of diffuseness in the residual downmix from the received diffuseness parameter. Indeed, in some embodiments, the same parameter values may be used directly. In other embodiments, the parameter values may e.g. be compensated for the energy of extracted audio objects etc. Thus, a diffuseness parameter descriptive of the full (non-residual) downmix will inherently also be descriptive and indicative of the residual downmix.

In some embodiments, the diffuseness processor 603 may receive the downmix including the audio objects O and therefrom generate a residual downmix by extracting the objects O. In embodiments wherein the encoder 601 directly generates the residual downmix, the diffuseness processor 603 may directly receive the residual downmix.

The diffuseness processor 603 may generate the direction dependent diffuseness parameter in any suitable way. For example, the diffuseness processor 603 may evaluate each channel of the residual downmix to determine a diffuseness parameter for that channel. This may for example be done by evaluating the common energy levels over the channels of the residual downmix and alternatively or additionally over time. Since diffuse components typically have a direction independent character. Alternatively, the relative contribution of the components $O_2$ and $O_3$ to the residual downmix channels may be evaluated to derive the diffuseness parameter.

In some embodiments, the diffuseness processor 603 may directly receive the input audio data and the downmix matrix (D) and may therefrom generate a diffuseness parameter. For example, the input data may characterize whether individual sound components are diffuse or point like, and the diffuseness processor 603 may for each channel of the downmix generate a diffuseness value which indicates the proportion of the energy of the channel which has originated from diffuse sources relative to the proportion that originated from point like sources.

The diffuseness processor 603 thus generates a direction dependent diffuseness parameter which for each channel of the downmix indicates how large a proportion of signal of the channel corresponds to diffuse sound and how much corresponds to non-diffuse sound.

The diffuseness parameter may further be frequency dependent and specifically the determination of values of the diffuseness parameter may be performed in individual frequency bands. Typically the frequency bands may be logarithmically divided over the full frequency range to ensure a perceptual relevant distribution.

The encoder 601 and the diffuseness processor 603 are coupled to an output circuit 605 which generates an encoded data stream which comprises the downmix generated by the encoder 601 (i.e. either the residual downmix or the full audio scene downmix), the data characterizing, the audio objects, and the direction dependent diffuseness parameter.

Figure 7:
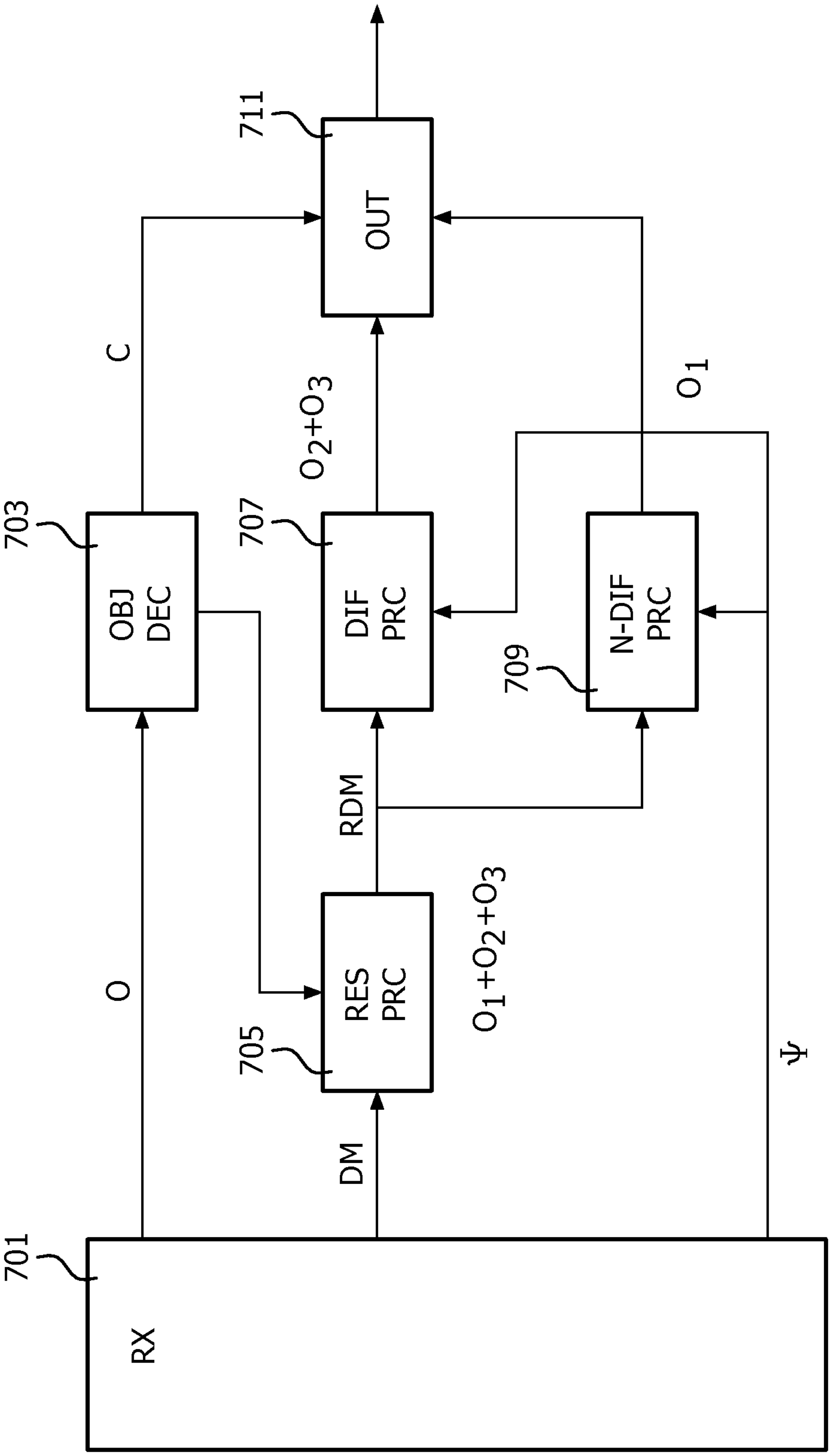
FIG. 7 illustrates an example of a spatial audio rendering device in accordance with some embodiments of the invention.

FIG. 7 illustrates an example of elements of the spatial audio rendering device 503. The spatial audio rendering device 503 comprises a receiver which receives the encoded audio stream from the spatial audio encoding device 501. Thus, the spatial audio rendering device 503 receives the encoded audio stream that comprises a representation of the audio scene in the form of the sound components O represented by audio objects and the sound components $O_1$, $O_2$, $O_3$ and possibly O represented by a downmix.

The receiver 701 is arranged to extract the audio object data and to feed them to an audio object decoder 703 which is arranged to recreate the audio objects O. It will be appreciated that a traditional approach for recreating the audio objects may be used and that local rendering side manipulations may be applied such as a user specific spatial positioning, filtering or mixing. The audio objects are created to match a given speaker setup used by the spatial audio rendering device 503. The audio object decoder 703 accordingly generates a set of signals that match the specific spatial speaker configuration which is used by the spatial audio rendering device 503 to reproduce the encoded audio scene.

In the example of FIG. 7, the encoded audio stream comprises a full downmix of the audio scene. Thus, when the audio objects are explicitly rendered as in the example of FIG. 7, the rendering of the downmix should not include the audio objects but should instead be based on a residual downmix which does not include the audio objects. Accordingly, the spatial audio rendering device 503 of FIG. 7 comprises a residual processor 705 which is coupled to the receiver 701 and the audio object decoder 703. The residual processor 705 receives the full downmix as well as audio object information and it then proceeds to extract the audio objects from the downmix to generate the residual downmix. The extracting process must extract the audio objects complementary to how they were included in the downmix in the encoder 601. This may be achieved by applying the same mix matrix operation to the audio objects that was used to generate the downmix at the encoder and accordingly this matrix (D) may be communicated in the encoded audio stream.

In the example of FIG. 7, the residual processor 705 thus generates the residual downmix but it will be appreciated that in embodiments wherein the residual downmix is encoded in the encoded audio stream, this may be used directly.

The residual downmix is fed to a diffuse sound processor 707 and a non-diffuse sound processor 709. The diffuse sound processor 707 proceeds to render (at least part of) the downmix signal using rendering approaches/techniques that are suitable for diffuse sound and the non-diffuse sound processor 709 proceeds to render (at least part of) the downmix signal using rendering approaches/techniques that are suitable for non-diffuse sound, and specifically which is suitable for point like sources. Thus, two different rendering processes are applied in parallel to the downmix to provide differentiated rendering. Furthermore, the diffuse sound processor 707 and the non-diffuse sound processor 709 are fed the diffuseness parameter and adapt their processing in response to the diffuseness parameter.

As a low complexity example, a gain for respectively the diffuse sound processor 707 and the non-diffuse sound processor 709 may be varied dependent on the diffuseness parameter. In particular, the gain for the diffuse sound processor 707 may be increased for an increased value of the diffuseness parameter and the gain for the non-diffuse sound processor 709 may be decreased for an increased value of the diffuseness parameter. Thus, the value of the diffuseness parameter controls how much the diffuse rendering is weighted relative to the non-diffuse rendering.

The diffuse sound processor 707 and the non-diffuse sound processor 709 both apply a transformation to the residual downmix which transforms the residual downmix into a set of signals suitable for rendering by the spatial speaker configuration used in the specific scenario.

The resulting signals from the audio object decoder 703, the diffuse sound processor 707, and the non-diffuse sound processor 709 are fed to an output driver 709 wherein they are combined into a set of output signals. Specifically, each of the audio object decoder 703, the diffuse sound processor 707, and the non-diffuse sound processor 709 may generate a signal for each speaker of the spatial speaker configuration, and the output driver 709 may combine the signals for each speaker into a single driver signal for that speaker. Specifically, the signals may simply be summed although in some embodiments the combination may e.g. be user adjustable (e.g. allowing a user to change the perceived proportion of diffuse sound relative to non-diffuse sound).

The diffuse sound processor 707 includes a decorrelation process in the generation of the set of diffuse signals. For example, for each channel of the downmix, the diffuse sound processor 707 may apply a decorrelator which results in the generation of audio which is decorrelated with respect to that which is presented by the non-diffuse sound processor 709. This ensures that the sound components generated by the diffuse sound processor 707 are indeed perceived as diffuse sound rather than as sound originating from specific positions.

The spatial audio rendering device 503 of FIG. 7 accordingly generates the output signal as a combination of sound components generated by three parallel paths with each path providing different characteristics with respect to the perceived diffuseness of the rendered sound. The weighting of each path may be varied to provide a desired diffuseness characteristic for the rendered audio stage. Furthermore, this weighting can be adjusted based on information of the diffuseness in the audio scene provided by the encoder. Furthermore, the use of a direction dependent diffuseness parameter allows the diffuse sound to be rendered with some spatial characteristics. In addition, the system allows a spatial audio rendering device 503 to adapt the received encoded audio signal to be rendered with many different spatial speaker configurations.

In the spatial audio rendering device 503 of FIG. 7, the relative contribution of the signals from the diffuse sound processor 707 and the non-diffuse sound processor 709 are weighted such that an increasing value of the diffuseness parameter (i.e. indicative of increasing diffuseness) will increase the contribution of the diffuse sound processor 707 in the output signal relative to the contribution of the non-diffuse sound processor 709. Thus, an increasing diffuseness being indicated by the encoder will result in the output signal containing a higher proportion of the diffuse sound generated from the downmix in comparison to the non-diffuse sound generated from the downmix.

Specifically, for a given channel of the residual downmix, a first weight or gain for the non-diffuse sound processor 709 may be decreased for an increasing diffuseness parameter value. At the same time, a second weight or gain for the diffuse sound processor 707 may be increased for an increasing diffuseness parameter value.

Furthermore, in some embodiments, the first weight and the second weight can be determined such that a combination of the two weights has a substantially signal independent value. Specifically, the first weight and the second weight may be determined such that the combined energy of the signals generated by the diffuse sound processor 707 and the non-diffuse sound processor 709 is substantially independent of the value of the diffuseness parameter. This may allow the energy level of components of the output signal generated from the downmix to correspond to the downmix. Thus, variations in diffuseness parameter values will not be perceived as a change in the sound volume but only in the diffuseness characteristics of the sounds.

In this respect, the two weights may need to be generated differently depending on the adaptations in cross-correlation between the two paths from 707 and 709. For example, in case a diffuse component ($O_2+O_3$) is processed by a decorrelator, the energy may be decreased when recombined with the non-diffuse component ($O_1$). This can be compensated by, for example, using a higher gain for the non-diffuse component. Alternatively, the weighting in the output stage (711) can be determined accordingly.

As a specific example, the processing of the diffuse sound processor 707 and the non-diffuse sound processor 709 may be independent of the diffuseness parameter except for a single gain setting for each channel of the residual downmix.

For example, a residual downmix channel signal may be fed to the diffuse sound processor 707 and the non-diffuse sound processor 709. The diffuse sound processor 707 may multiply the signal by a factor of $\sqrt{\Psi}$ and then continue to apply the diffuseness parameter independent processing (including the decorrelation). The non-diffuse sound processor 709 in contrast multiplies the signal by a factor of $\sqrt{1-\Psi}$ and then continues to apply the diffuseness parameter independent processing (with no decorrelation).

Alternatively, the multiplication of the diffuse signal with a factor dependent of the diffuseness parameter may be applied after processing by the diffuse sound processor 707 or as a last or intermediate step in the diffuse sound processor 707. A similar approach may be applied for the non-diffuse sound processor 709.

In the system, the diffuseness parameter provides a separate value for each of the downmix channels (in case of a plurality of channels) and thus the multiplication factors (gains) will be different for the different channels thereby allowing a spatially differentiated separation between diffuse and non-diffuse sounds. This may provide improved user experience and may in particular improve rendering for diffuse sounds with some spatial characteristics, such as a choir.

In some embodiments, the diffuseness parameter can be frequency dependent. For example, a separate value may be provided for each of a set of frequency intervals (e.g. ERB or BARK bands). The residual downmix may be converted to the frequency band (or may already be a frequency band representation) with the diffuseness parameter dependent scaling being performed in the frequency band. Indeed, the remaining processing may also be performed in the frequency domain, and a conversion to the time domain may e.g. only be performed after the signals of the three parallel paths have been combined.

It will be appreciated that the specific processing applied by the diffuse sound processor 707 and the non-diffuse sound processor 709 may depend on the specific preferences and requirements of the specific embodiments.

The processing of the non-diffuse sound processor 709 will typically be based on an assumption of the processed signal (e.g. the residual downmix after a diffuseness parameter dependent weighting) contains point like sound components. Accordingly, it may use panning techniques to convert from a given spatial position associated with a channel of the residual downmix to signals for speakers at the specific positions of the spatial speaker configuration.

As an example, the non-diffuse sound processor 709 may apply panning to the downmix channels for improved positioning of the point-like sound components on the spatial speaker configuration. In contrast to diffuse components, panned contributions of point-sources must be correlated to obtain a phantom source between two or more speakers.

In contrast the operation of the diffuse sound processor 707 will typically not seek to maintain the spatial characteristics of the channels of the downmix channels but will rather try to distribute the sound between channels such that spatial characteristics are removed. Furthermore, the decorrelation ensures that the sound is perceived to be differentiated from that resulting from the non-diffuse sound processor 709 and such that the impact of differences between spatial positions of the rendering speakers and the assumed spatial positions is mitigated. Some examples of how the diffuse sound processor 707 may generate rendering signals for different spatial speaker configurations will be described.

The approach of the described system is particularly suitable for adapting the encoded audio stream to different spatial rendering configurations. For example, different end users may use the same encoded audio signal with different spatial speaker configurations (i.e. with different real or virtual audio transducer positions). For example, some end-users may have five spatial channel speakers, other users may have seven spatial channel speakers etc. Also, the positions of a given number of speakers may vary substantially between different setups or indeed with time for the same setup.

The system of FIG. 5 may thus convert from a residual downmix representation using N spatial channels to a spatial rendering configuration with M real or virtual speaker positions. The following description will focus on how the diffuse sound can be rendered using different spatial speaker configurations.

The diffuse sound processor 707 may first generate one diffuse signal from each channel of the downmix by applying a decorrelation to the signal of the channel (and scaling in accordance with the diffuseness parameter) thereby generating N diffuse signals.

The further operation may depend on the characteristics of the spatial speaker configuration relative to the downmix, and specifically on the relative number of spatial channels of each (i.e. on the number N of channels in the residual downmix/generated diffuse sound signals and the number M of real or virtual speakers in the spatial speaker configuration).

Firstly, it is noted that the spatial speaker configuration may not be distributed equidistantly in the listening environment. For example, as illustrated in FIG. 8, the concentration of speakers may often be higher towards the front than towards the sides or to the back.

This may be taken into consideration by the system of FIG. 5. Specifically, the diffuse sound processor 707 may be arranged to adjust an audio level/gain for the generated diffuse signals depending on a proximity between the speakers. For example, the level/gain for a given channel may be dependent on the distance from the speaker position for that channel and the nearest speaker position or positions also used for diffuse rendering. The distance may be an angular distance. Such an approach may address that the speakers are typically not equally distributed. Therefore, after the diffuse sound signals have been generated, the power in the individual speakers is adjusted to provide a homogenous diffuse sound field. Alternatively, the diffuseness can be given a spatial component by adjusting the powers in the individual speakers.

Figure 8:
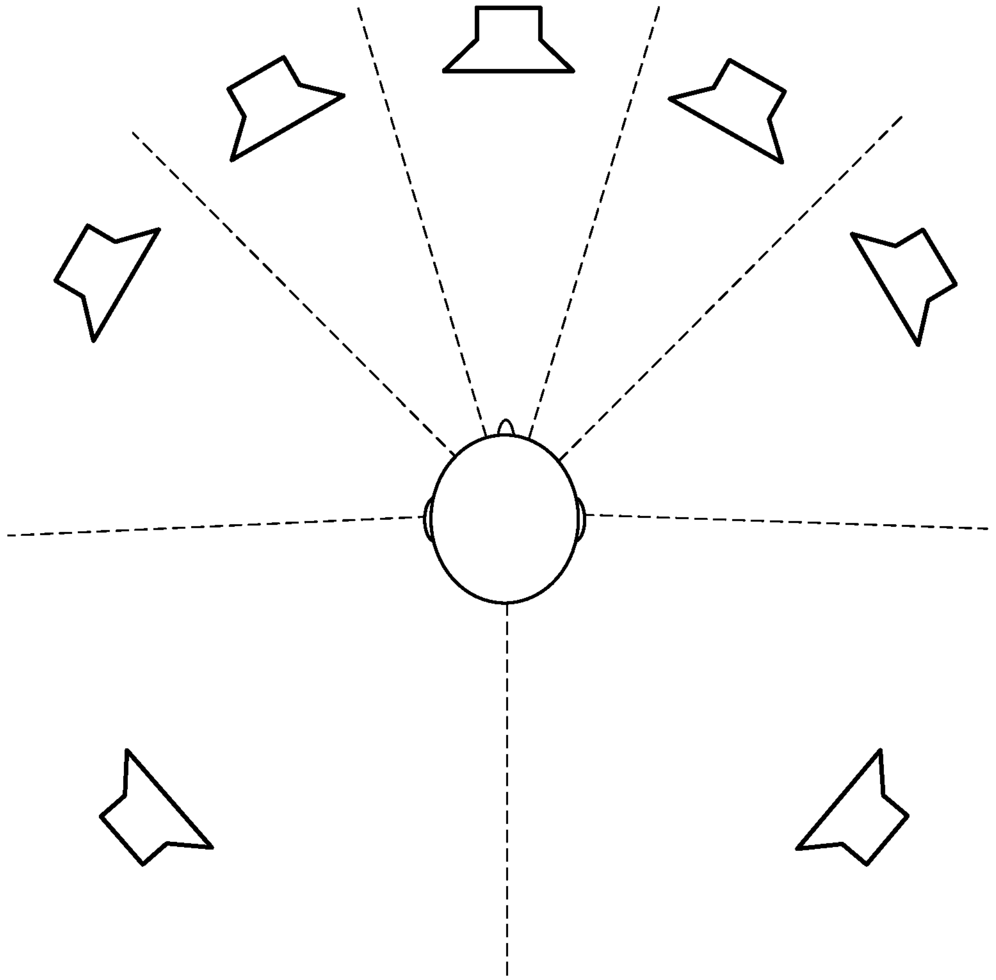
FIG. 8 illustrates an example of a spatial speaker configuration.

One approach to adjust the power to provide a homogenous sound field is to divide the circle (or sphere in case of 3D) into sections that are represented by a single speaker (as indicated in FIG. 8). The relative power distribution can then be determined as:

$$P_{rel}[k] = \frac{\theta_k}{2\pi},$$

where $\theta_k$ represents the angular width of the section corresponding to speaker k. Similarly, in case of 3D the relative power distribution can be determined by the relative surface on a sphere represented by a speaker.

In some embodiments, the initial number of generated diffuse signals (corresponding to the number of channels in the downmix) may be identical to the number of speaker positions in the spatial speaker configuration, i.e. N may be equal to M.

In some embodiments, where the spatial speaker configuration comprises a number of channels corresponding to the number of channels in the residual downmix, the diffuse sound processor 707 may be arranged to map channels of the residual downmix to speaker positions of the spatial rendering configuration in response to spatial information associated with the residual downmix. Alternatively or additionally they may simply be mapped randomly. Thus, for N=M diffuse signals may be mapped depending on spatial information for residual downmix channels or at random.

Specifically, the system can do this by trying to find the best possible match between the angles of the generated N diffuse sound signals (as transmitted to the decoder) and the angles of the speaker positions. If such information is not available, the signals may be represented in arbitrary order.

In many scenarios, the number of residual downmix channels, and thus the number of initially generated diffuse channels, may be less than the number of spatial channels output by the spatial audio rendering device 503, i.e. the number of speaker positions in the spatial speaker configuration may be less than the number of residual downmix channels, N<M.

In such a scenario, more than one decorrelation may be applied to at least one of the channels of the residual downmix. Thus, two or more decorrelated audio signals may be generated from a single downmix channel resulting in two or more diffuse sound signals being generated from a single residual downmix channel. By applying two different decorrelations on the same channel, the resulting signals can also be generated to be decorrelated with each other thereby providing a diffuse sound.

In scenarios wherein the residual downmix comprises two or more channels and two or more additional output channels are to be generated, it will typically be advantageous to use more than one of the residual downmix channels. For example, if two new diffuse sound signals are to be generated and the residual downmix is a stereo signal, one new diffuse sound signal may be generated by applying a decorrelation to one of the stereo downmix channels and the other new diffuse sound signal may be generated by applying a decorrelation to the other stereo downmix channel. Indeed, since the diffuse sounds of the two stereo downmix channels are typically highly decorrelated, the same decorrelation may be applied in sequence to the two stereo downmix channels to generate two new diffuse sound signals, which are not only decorrelated with respect to the diffuse sound of the residual downmix channels but also with respect to each other.

It may be advantageous to consider the spatial speaker configuration when generating decorrelated signals. For example, the diffuse sound of the residual downmix channels may be mapped to the speakers in the configuration that are spatially closest to the corresponding downmix channel's intended spatial position. The decorrelated signals can be fed to the remaining speakers, using the closest downmix channel as an input to the decorrelator.

Thus, in an embodiment where the number of speakers in the speaker setup is larger than the number of channels in the residual downmix, additional diffuse sound signals may need to be generated.

E.g. if a monophonic residual downmix is received, an additional diffuse sound signal can be generated by applying a decorrelation thereto. A third diffuse sound signal can be generated by applying a different decorrelation to the monophonic residual downmix etc.

It will be appreciated that the approach may further introduce appropriate scaling of the individual decorrelations to provide energy conservation for the diffused sound. Thus, the processing involved in the diffused sound field signal generation may simply consist of applying decorrelation and optional scaling to ensure that the total diffuse source energy remains the same.

In case more than one channel of the residual downmix is present, i.e., N>1, it is typically advantageous to derive the additional diffuse sound signals in a balanced manner using as many channels of the residual downmix as is practical. For example, if two channels of the residual downmix are transmitted and four diffuse sound signals are required, two decorrelations may advantageously be applied to each of the two residual downmix channels rather than applying three or four decorrelations to one of the residual downmix channels.

In many cases it may be advantageously to use the diffuse signals from the residual downmix as such and generate only the missing signals using one or more decorrelators.

It will be appreciated that the decorrelations to generate additional diffuse sound signals need not be applied directly to the signals of the residual downmix but may be applied to the already decorrelated signals. For example, a first diffuse sound signal is generated by applying a decorrelation to a signal of the residual downmix. The resulting signal is rendered directly. In addition, a second diffuse sound signal is generated by applying a second decorrelation to the first diffuse sound signal. This second diffuse sound signal is then rendered directly. This approach is equivalent to applying two different decorrelations directly to the signal of the residual downmix where the overall decorrelation for the second diffuse sound signal corresponds to the combination of the first and second decorrelations.

It will be appreciated that the decorrelations to generate additional diffuse sound signals may also be applied after an estimate of the diffuse components has been made by the diffuse sound processor 707. This has the advantage that the signals as input to the decorrelations are of a more suitable nature thereby increasing the audio quality.

Such an approach may be particularly efficient in many embodiments as the second decorrelation step may be reused for a plurality of first correlations, i.e. for plurality of residual downmix channels.

In some scenarios, the diffuse sound processor 707 may be arranged to generate fewer diffuse sound signals than speaker positions of the spatial speaker configuration. Indeed, in some scenarios it may provide improved diffused sound perception to render the diffuse sound from only a subset of speaker positions. It is often difficult to either measure a diffuse sound field (e.g. microphone signals of a soundfield microphone are highly correlated) or to synthesize mutually decorrelated diffuse sound signals efficiently. With a high number of speakers, the added value of rendering diffuse signals on all speakers is limited, and in some cases the use of decorrelators may have a larger negative effect. Therefore it may in some scenarios be preferable to render only a few diffuse sound signals to the speakers. If the speaker signals are mutually correlated this can result in a small sweet spot.

In some embodiments or scenarios, the number of channels of the residual downmix may exceed the number of speakers in the spatial speaker configuration, i.e. N>M. In this example, a number of channels (specifically N-M channels) of the residual downmix may simply be ignored and only M diffuse sound signals may be generated. Thus, in this example, one correlation may be applied to each of M channels of the residual downmix thereby generating M diffuse sound signals. The residual downmix channels to be used may be selected as those that are closest in terms of angle to the speaker positions of the spatial speaker configuration, or may e.g. simply be selected randomly.

In other embodiments, downmix channels may be combined either before or after decorrelation. For example, two downmix channels may be summed and a decorrelation may be applied to the sum signal to generate a diffuse sound signal. In other embodiments, decorrelations may be applied to two downmix signals and the resulting decorrelated signals may be summed. Such an approach may ensure that all (diffuse) sound components are represented in the output diffuse signal.

In some embodiments, the diffuse sound processor 707 may be arranged to generate the diffuse sound signals such that they correspond to a sideways rendering for the (nominal or reference) listening position of the spatial speaker configuration. For example, two diffuse channels may be rendered from opposite sides of a nominal or reference frontal direction (between 75° to 105° to the right and left).

Thus, as a low complexity alternative to generating additional signals via a decorrelation process, the synthesis of the diffuse sound field may be conducted by generating a low number of (virtual) diffuse sound signals to the left and right position of the subject, i.e., at an angle of around +/−90° with respect to the front listening/viewing direction. E.g. if N=2, and the signals are to be generated for a regular 5.1 set-up (at −110°, −30°, 0°, +30° and −110°), two virtual diffuse sound signals may be generated by panning a first diffuse sound signal between the left surround (−110°) and left front (−30°) speakers at approximately −90°, the second diffuse sound signal may be panned between the right front (+30°) and the right surround (+110°) speakers at approximately +90°. The associated complexity is typically lower than when using additional decorrelations. However as a trade-off, the perceived quality of the diffuse sound field may be reduced, e.g. when turning the head (increased correlation) or moving outside of the sweet spot (precedence effect).

It will be appreciated that any suitable representation of the residual downmix may be used, including a representation as a mono downmix, a stereo downmix or a surround sound 5.1 downmix.

In some embodiments, the residual downmix may be described using a B-format signal representation. This format represents four microphone signals corresponding to:

1. an omnidirectional microphone,
2. a figure-of-eight microphone in the front-back direction,
3. a figure-of-eight microphone in the left-right direction, and
4. a figure-of-eight microphone in the up-down direction.

The last microphone signal is sometimes omitted thereby limiting the description to the horizontal plane. The B-format representation may often in practice be derived from an A-format representation which corresponds to signals from four cardioid microphones on the faces of a tetrahedron.

In case the diffuse soundfield is described with an A-format or B-format signal representation, e.g. when the diffuse soundfield is recorded with a soundfield microphone, the speaker signals can be derived from this representation. Since A-format can be translated to B-format, which is commonly, and more easily, used for content generation, the further description will assume B-format recording.

The constituent signals of a B-format representation can be mixed to create a different signal representing another virtual microphone signal of which the directionality can be controlled. This can be done creating virtual microphones directed at the intended speaker positions, resulting in signals that can directly be sent to the corresponding speakers.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A spatial audio rendering apparatus, comprising:

a first circuit for providing a residual downmix and data characterizing at least one audio object, the residual downmix corresponding to a downmix of audio components of an audio scene with the at least one audio object being removed;

a receiver for receiving a diffuseness parameter indicative of a degree of diffuseness of the residual downmix;

a first sound processor for generating a first set of signals for a spatial speaker configuration by applying a first transformation to the residual downmix, the first transformation being dependent on the diffuseness parameter;

a second sound processor for generating a second set of signals for the spatial speaker configuration by applying a second transformation to the residual downmix, the second transformation being dependent on the diffuseness parameter and comprising a decorrelation of at least one channel of the residual downmix;

a second circuit for generating a third set of signals for the spatial speaker configuration from the data characterizing the at least one audio object; and an output circuit for generating an output set of signals for the spatial speaker configuration by combining the first, second and third set of signals;

wherein the diffuseness parameter is direction dependent.

2. The spatial audio rendering apparatus of claim 1, wherein the diffuseness parameter comprises individual diffuseness values for different channels of the residual downmix.

3. The spatial audio rendering apparatus of claim 1, wherein for at least one channel of the residual downmix, a contribution of the second transformation relative to a contribution of the first transformation in the output signal increases for the diffuseness parameter indicating an increased diffuseness.

4. The spatial audio rendering apparatus of claim 1, wherein a combined energy of the first set of signals and the second set of signals is substantially independent of the diffuseness parameter.

5. The spatial audio rendering apparatus of claim 1, wherein the second audio processor is configured to adjust an audio level of a first signal of the second set of signals in response to a distance of a speaker position associated with the first signal to at least one neighboring speaker position associated with a different signal of the second set of signals.

6. The spatial audio rendering apparatus of claim 1, wherein the residual downmix comprises fewer channels than a number of speaker positions of the spatial speaker configuration, and wherein the second audio processor is configured to generate a plurality of signals of the second set of signals by applying a plurality of decorrelations to at least a first channel of the residual downmix.

7. The spatial audio rendering apparatus of claim 6, wherein the second audio processor is configured to generate a further plurality of signals of the second set of signals by applying a plurality of decorrelations to a second channel of the residual downmix, the second channel not being a channel of the at least first channels.

8. The spatial audio rendering apparatus of claim 1, wherein the second set of signals comprises fewer signals than a number of speaker positions in the spatial speaker configuration.

9. The spatial audio rendering apparatus of claim 1, wherein the residual downmix comprises more channels than a number of speaker positions of the spatial speaker configuration, and wherein the second audio processor is configured to combine at least two channels of the residual downmix when generating the second set of signals.

10. The spatial audio rendering apparatus of claim 1, wherein the second audio processor is configured to generate the second set of signals to correspond to a sideways rendering of audio from the second set of signals.

11. The spatial audio rendering apparatus of claim 1, wherein the receiver is configured to receive a received downmix comprising the audio objects; and wherein the circuit for providing the residual downmix is configured to generate at least one audio object in response to the data characterizing the data objects, and to generate the residual downmix by extracting the at least one audio object from the received downmix.

12. The spatial audio rendering apparatus of claim 1, wherein the spatial speaker configuration is different from a spatial sound representation of the residual downmix.

13. A method of generating spatial audio output signals, the method comprising:

providing a residual downmix and data characterizing at least one audio object, the residual downmix corresponding to a downmix of audio components of an audio scene with the at least one audio object being removed;

receiving a diffuseness parameter indicative of a degree of diffuseness of the residual downmix;

generating a first set of signals for a spatial speaker configuration by applying a first transformation to the residual downmix, the first transformation being dependent on the diffuseness parameter;

generating a second set of signals for the spatial speaker configuration by applying a second transformation to the residual downmix, the second transformation being dependent on the diffuseness parameter and comprising a decorrelation of at least one channel of the residual downmix;

generating a third set of signals for the spatial speaker configuration from the data characterizing the at least one audio object; and generating an output set of signals for the spatial speaker configuration by combining the first, second and third set of signals;

wherein the diffuseness parameter is direction dependent.

* * * * *